(12) United States Patent
Blake et al.

(10) Patent No.: US 6,888,981 B2
(45) Date of Patent: May 3, 2005

(54) WAVELENGTH DIVISION MULTIPLEXING COUPLER WITH LOSS ELEMENT

(75) Inventors: James Blake, Paradise Valley, AZ (US); Ren-Young Liu, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 95 days.

(21) Appl. No.: 10/243,113

(22) Filed: Sep. 13, 2002

(65) Prior Publication Data

US 2004/0052452 A1 Mar. 18, 2004

(51) Int. Cl.[7] ................................................. G02B 6/26
(52) U.S. Cl. ............................. 385/27; 385/37; 385/45
(58) Field of Search .............................. 385/27, 31, 37, 385/39–42, 45

(56) References Cited

U.S. PATENT DOCUMENTS

| | | | |
|---|---|---|---|
| 5,469,520 A | 11/1995 | Morey et al. | |
| 5,475,780 A | * 12/1995 | Mizrahi | 385/37 |
| 5,633,965 A | * 5/1997 | Bricheno et al. | 385/37 |
| 5,684,590 A | 11/1997 | Sanders et al. | |
| 6,081,641 A | 6/2000 | Chen | |
| 6,169,832 B1 | * 1/2001 | McLandrich | 385/43 |
| 6,201,918 B1 | 3/2001 | Berkey et al. | |
| 6,215,929 B1 | 4/2001 | Byron | 385/37 |
| 6,226,428 B1 | 5/2001 | Saito et al. | 385/42 |
| 6,226,438 B1 | 5/2001 | Bylander et al. | 385/136 |
| 6,249,623 B1 | 6/2001 | Patrick et al. | |
| 6,684,019 B1 | * 1/2004 | Norwood et al. | 385/129 |
| 2003/0152116 A1 | * 8/2003 | Liao et al. | 372/6 |
| 2003/0152385 A1 | * 8/2003 | Eldada et al. | 398/34 |

FOREIGN PATENT DOCUMENTS

| | | | | |
|---|---|---|---|---|
| EP | 0372907 A | | 6/1990 | |
| JP | 03144615 A | * | 6/1991 | G02F/3/02 |

* cited by examiner

*Primary Examiner*—Juliana K. Kang

(57) ABSTRACT

A method and system for adjusting power at output ports of a wavelength division multiplexing (WDM) coupler. A loss element may be placed at one or more of the output ports of the WDM coupler. The loss element may have a filter characteristic that matches the temperature sensitivity coefficient of the WDM coupler. The filter characteristic may reject power at one of the two output ports as a function of temperature. As a result, the loss element may balance the power at the output ports of the WDM coupler despite temperature variations.

19 Claims, 4 Drawing Sheets

WAVELENGTH DIVISION MULTIPLEXING COUPLER WITH LOSS ELEMENT

GOVERNMENT INTERESTS

The Government may have rights in this invention pursuant to Contract No. DL-H-513262, awarded by the Department of the Navy.

BACKGROUND

1. Field of the Invention

This invention relates to a wavelength division multiplexing (WDM) coupler and more particularly to a temperature sensitive loss element for the WDM coupler.

2. Description of the Related Art

A WDM coupler couples light from one or more light sources onto two or more wave guides. At its simplest form, the WDM coupler has one input port and two output ports. Light input into the one input port may be split so as to exit the two output ports.

The splitting of the light is typically measured by a splitting ratio. The splitting ratio defines a percentage power of the light output at each of the two output ports of the WDM coupler as compared to a total power of the light input into the WDM coupler. A 50/50 splitting ratio, for example, means that the power exiting each of the two output ports is 50% of the power that inputs the one input port. The splitting ratio is a function of a wavelength of the light input into the WDM coupler. If the wavelength of the light input into the input port of the WDM coupler is $\lambda_c$, then the WDM coupler splits the light so that the power output at the two output ports is balanced, i.e., 50% of the power that is input into the WDM coupler is output at each output port. If the wavelength of the light input into the WDM coupler varies from $\lambda_c$, then the power output at the two output ports will not be balanced, e.g., the power at one output port is different from the power at the other output port.

The WDM coupler is temperature sensitive. The wavelength, $\lambda_c$, at which the WDM coupler has the 50/50 splitting ratio varies with the temperature of the WDM coupler. The temperature sensitivity of the WDM coupler is typically minimized by stabilizing the temperature of the WDM coupler. A temperature control device, for example, a temperature chamber or a heater, can maintain a constant temperature of the WDM coupler. By maintaining the constant temperature, the wavelength, $\lambda_c$, at which the WDM coupler has a 50/50 splitting ratio remains constant. As a result, light which is input into the WDM coupler and which has a wavelength equal to the wavelength $\lambda_c$ for the constant temperature can be assuredly split at the splitting ratio, regardless of external temperature variations.

SUMMARY

The present invention stems from a realization that it takes time for a temperature control device to stabilize the temperature of the WDM coupler. Depending on how rapidly the external temperature varies, the temperature control device might not be able to stabilize the temperature of the WDM coupler to the proper temperature. As a result, the wavelength $\lambda_c$ will not be stabilized and the WDM coupler will not be able to achieve the splitting ratio for the light input into the WDM coupler. Therefore, it would be advantageous to have a more robust solution for minimizing the temperature sensitivity of the WDM coupler.

In accordance with a principal aspect of the present invention, a loss element may be added to one or more of the output ports of the WDM coupler. The loss element may adjust the power output at the output ports of the WDM coupler in accordance with the temperature of the WDM coupler. As a result, the loss element may compensate for the temperature sensitivity of the WDM coupler. The output ports may output power at the splitting ratio designed for the WDM coupler.

The WDM coupler may have a coupling section, one or more input ports, and two or more output ports. Light may be input at the one or more input ports, passed through the coupling section, and output at the two or more output ports. The WDM coupler may have a temperature sensitivity coefficient that defines the temperature sensitivity of the WDM coupler. The temperature sensitivity coefficient may indicate how the wavelength at which the splitting ratio of the WDM coupler is 50/50, for example, changes as a function of temperature.

The temperature sensitivity coefficient of the WDM coupler may be determined by placing the WDM coupler in a temperature control device. The temperature control device may maintain a particular temperature of the WDM coupler. Light from a light source may be input into the WDM coupler. The wavelength of the light from the light source may be adjusted so as to balance the power output at the output ports for the particular temperature. Then, the temperature of the temperature control device may be changed. The wavelength of the light may be, again, adjusted so as to balance the power output at the output ports. The process of varying the temperature of the temperature control device and determining the wavelength at which power at the output ports is balanced allows for determining the relationship between temperature and the wavelength of light at which the power at the output ports of the WDM coupler is balanced. This relationship is the temperature sensitivity coefficient of the WDM coupler.

To compensate for the temperature sensitivity coefficient of the WDM coupler, a loss element may be placed at one or more of the output ports. The loss element may be a fiber grating, for example, with an index of refraction that changes as a function of temperature. The loss element may be designed with a filter characteristic that matches the temperature sensitivity coefficient of the WDM coupler. A pass band and a stop band of the filter characteristic may shift as a function of temperature thereby adjusting the power output at the output ports of the WDM coupler. Preferably, the filter characteristic may reject the power at one of the output ports to balance the power output at the output ports of the WDM coupler despite temperature variations.

These as well as other aspects and advantages of the exemplary embodiments will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to following figures.

DETAILED DESCRIPTION OF EXEMPLARY EMBODIMENTS

Figure 1:
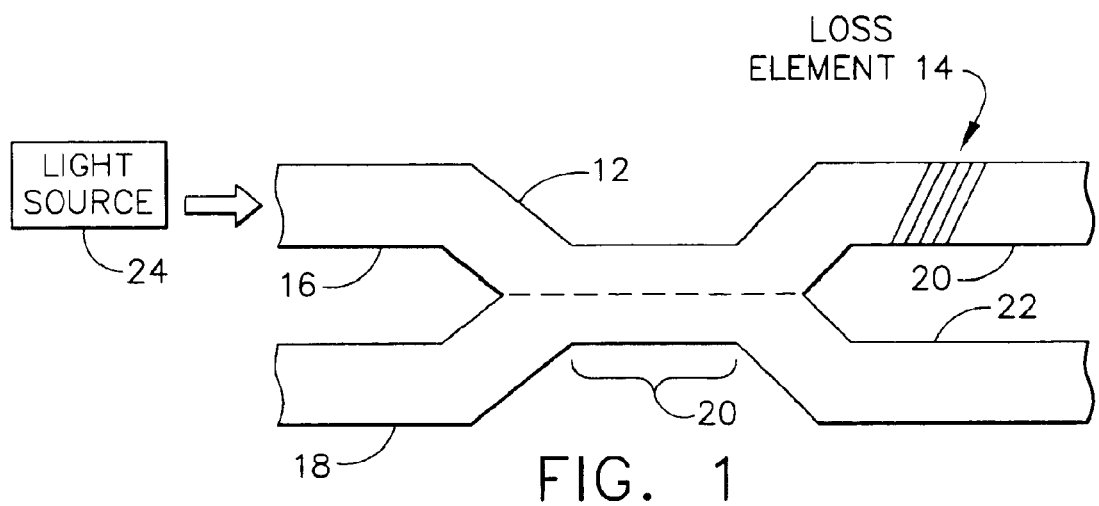
FIG. 1 is an exemplary WDM coupler having a loss element.

FIG. 1 is an exemplary WDM coupler 12 having a loss element 14. The WDM coupler 12 consists of wave guides (e.g., optic fibers), which are joined to form a coupling section 20. The coupling section 20 may be formed by heat-fusing and pulling the wave guides. Those skilled in the art will appreciate that the elements described herein may be implemented as discrete components or in conjunction with other components, in any suitable combination or location.

Generally, the WDM coupler 12 may have one or more input ports and two or more output ports. The WDM coupler 12 in FIG. 1, for example, has two input ports 16, 18 and two output ports 20, 22. If the light from a light source 24, e.g., a semiconductor laser diode or fiber optic light source, is launched into the input port 16, then the light may couple onto the output ports 20, 22. The coupling section 20 permits the coupling of the light between the input port 16 and the two output ports 20, 22.

The WDM coupler 12 may be designed to achieve a splitting ratio. The splitting ratio may be a percentage of power that is output at each of the two output ports of the WDM coupler 12. For example, the WDM coupler 12 may split light launched into the input port 16 such that 50% of the power of the light is output at output port 20 and 50% of the power of the light is output at output port 22. The WDM coupler 12 may thus have a 50/50 splitting ratio. Of course, the WDM coupler may be designed to achieve other splitting ratios.

The WDM coupler 12 may achieve the splitting ratio at a certain temperature. If the temperature of the WDM coupler 12 varies from the certain temperature, then the WDM coupler 12 may not achieve the 50/50 splitting ratio. To compensate for the variation in the temperature, the loss element 14 may be formed at one or both of the two output ports 20, 22 of the WDM coupler.

The loss element 14 may be a fiber grating with an index of refraction that varies as a function of temperature. As a result, the loss element may be designed with a filter characteristic that matches the temperature sensitivity of the WDM coupler 12. The WDM coupler 12 may, for example, have a +5 part-per-million (ppm)/° C. temperature sensitivity coefficient. The +5 ppm/° C. temperature sensitivity coefficient means that the wavelength at which the WDM coupler may achieve the required splitting ratio (e.g., 50/50) may vary by 5 ppm for every ° C. temperature change. To compensate for the +5 ppm/° C. temperature sensitivity coefficient, loss element 14 of the WDM coupler 12 may have a filter characteristic with a matching −5 ppm/° C. temperature sensitivity coefficient. The filter characteristic may adjust the power output at one of the output ports 20, 22 inversely to the temperature sensitivity coefficient of the WDM coupler so as to balance the power at the two outputs 20, 22 of the WDM coupler 12.

Arrangements other than those described herein are possible consistent with the exemplary embodiment of the present invention. The exemplary embodiments of the present invention, for example, are not limited by the number of input ports of the WDM coupler 12 or the number of output ports of the WDM coupler 12. Moreover, the exemplary embodiments of the present invention are not limited by the number loss elements or its placement at the output port(s). Still further, the exemplary embodiments of the present invention are not limited by the splitting ratio that the WDM coupler 12 is designed to achieve.

Figure 2:
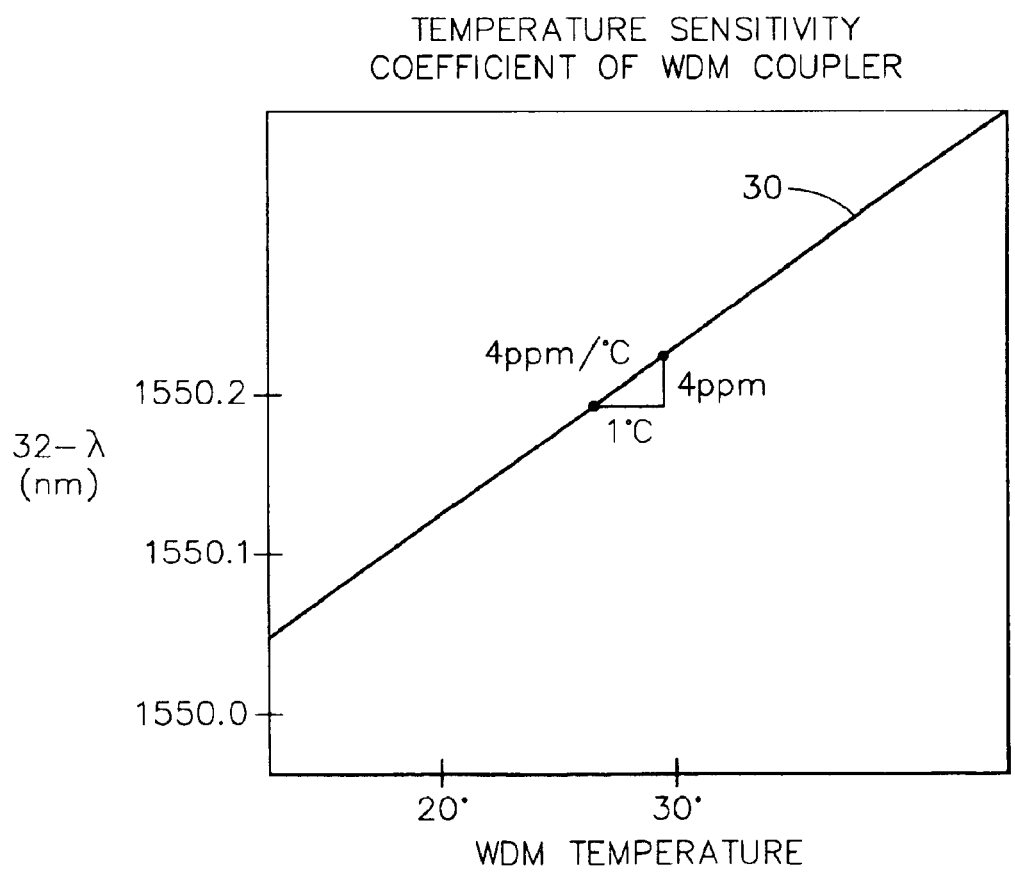
FIG. 2 is a curve illustrating a temperature sensitivity coefficient of the exemplary WDM coupler.

FIG. 2 is a curve of an exemplary temperature sensitivity coefficient of the WDM coupler. The temperature sensitivity coefficient, represented by curve 30, indicates a wavelength 32 and a temperature 34 at which the WDM coupler 12 may achieve the required splitting ratio, e.g., a 50/50 splitting ratio. As the temperature changes by one ° C., the wavelength 32 of the light source required to achieve a 50/50 splitting ratio may change by 4 ppm. The curve 30 may be used to design the filter characteristic of the loss element 14 so that the loss element 14 can compensate for the temperature sensitivity coefficient of the WDM coupler 12.

Of course, the exact relationship between the wavelength 32 of the light source and temperature 34 at which the splitting ratio is 50/50 may depend on the particular characteristics of the WDM coupler 12. The relationship of FIG. 2 is exemplary in nature. Typical WDM couplers have a temperature sensitivity coefficient of between −20 ppm/° C. to +20 ppm/° C. Other arrangements are also possible.

Figure 3:
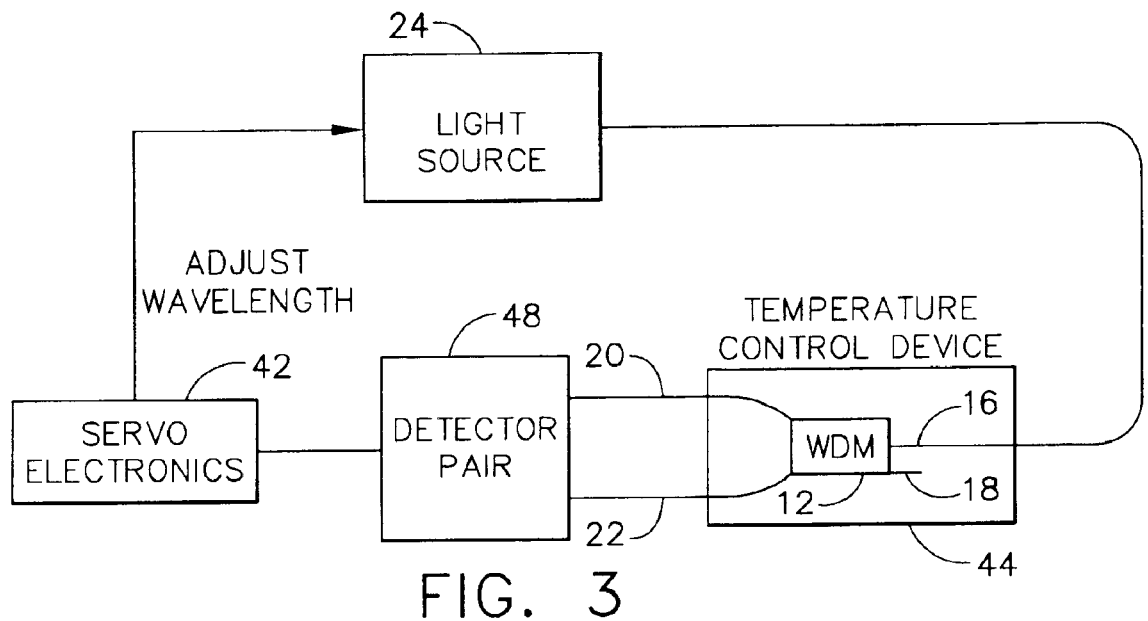
FIG. 3 is a block diagram of a system for determining the temperature sensitivity coefficient of the exemplary WDM coupler.

FIG. 3 is a block diagram of a system for determining the temperature sensitivity coefficient of the WDM coupler 12.

Generally, a temperature control device 44, e.g., a heater or a temperature chamber, may permit varying the temperature of the WDM coupler 12 so as to determine the temperature sensitivity coefficient of the WDM coupler 12. Light from the light source 24 may be input at one of the two input ports 16, 18 of the WDM coupler 12. The WDM coupler 12 may couple the light onto the two output ports 20, 22. At the output ports 20, 22, a detector pair 48 may measure the power at the two output ports 20, 22. The measure of the power may then be sent to servo electronics 42. The servo electronics 42 may adjust the wavelength of the light source 24 so that the power output at the WDM coupler 12 may be balanced for a given temperature of the temperature control device 44. For example, U.S. Pat. No. 5,684,590, entitled "Fiber Optic Gyroscope Source Wavelength Control, the contents of which are entirely incorporated by reference herein, describes various ways for measuring and controlling wavelength of the light source 24.

The temperature control device 44 may vary the temperature of the WDM coupler 12 through a range of temperatures. By tracking the temperature and wavelength at which the power at the two output ports 20, 22 is balanced for varying temperatures and wavelengths, the temperature sensitivity coefficient of the WDM coupler 12, as illustrated by FIG. 3, can be determined.

Figure 4:
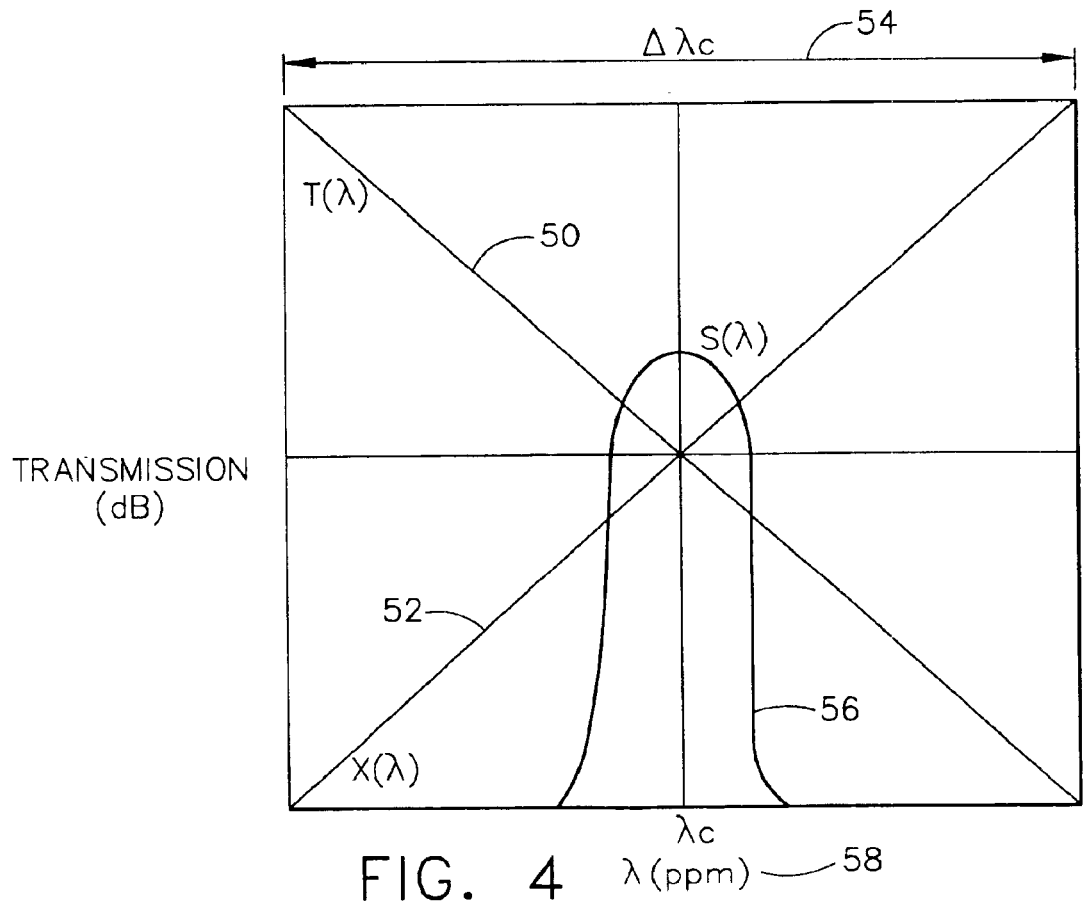
FIG. 4 is a transfer function that describes a splitting ratio for the exemplary WDM coupler.

FIG. 4 illustrates a typical transfer function of the WDM coupler 12. The transfer function describes mathematically how light input into one of the two input ports 16, 18 is split onto the two output ports 20, 22. The transfer function may be used to determine a relationship between differential power output of the WDM coupler 12 and wavelength drift (i.e., drift of the wavelength of light input into the WDM coupler 12). The relationship may be used to design the filter characteristic of the WDM coupler 12.

Through-port $T(\lambda)$ 50 describes how light input at one of the input ports 16, 18 is output at one of the output ports. Cross-coupled port $X(\lambda)$ 52 describes how light input at one of the input ports 16, 18 is output at the other output port. At a wavelength $\lambda_c$, the power of the light output at the through port $T(\lambda)$ 50 and the cross-coupled port $X(\lambda)$ 52 is balanced, i.e., a 50/50 splitting ratio. If the wavelength of the light input drifts from $\lambda_c$, then the power at the through port $T(\lambda)$ and the cross-coupled port $X(\lambda)$ might not be balanced.

The transfer function of the WDM coupler 12 at the through-port T(λ) 50 and the cross-coupled port X(λ) 52 may be modeled mathematically as follows:

$$T(\lambda) = \frac{1}{2} - \frac{1}{2}\sin\left(\frac{\pi}{\Delta\lambda_c}(\lambda - \lambda_c)\right) \quad (1)$$

$$X(\lambda) = \frac{1}{2} + \frac{1}{2}\sin\left(\frac{\pi}{\Delta\lambda_c}(\lambda - \lambda_c)\right) \quad (2)$$

The transfer function of the through-port T(λ) 50 and the cross-coupled port X(λ) may be a function of the wavelength λ 58 of the light source 24. Delta $\lambda_c$ ($\Delta\lambda_c$) 54 may represent a channel spacing that is selected in accordance with a spread 54 of the transfer function.

Assuming a light source 14 has a spectrum S(λ) 56, the power of the light output from each of the two output ports 20, 22 of the WDM coupler 22 may be calculated as:

$$P_T = \int T(\lambda)S(\lambda)d\lambda \quad (3)$$

$$P_X = \int X(\lambda)S(\lambda)d\lambda \quad (4)$$

The $P_T$ may be the power output at the through-port T(λ) and $P_X$ may be the output power at the cross-coupled port X(λ). The power at the two output ports 20, 22 may be balanced when a ratio of:

$$\frac{P_T - P_X}{P_T + P_X} = 0 \quad (5)$$

Substituting $P_T$ and $P_X$, the ratio of power may be approximated as:

$$\frac{P_T - P_X}{P_T + P_X} \approx \frac{\pi}{\Delta\lambda_c}(\bar{\lambda} - \lambda_c) + \frac{1}{6}\left(\frac{\pi}{\Delta\lambda_c}\right)^3 \int \lambda'^3 S(\lambda' + \lambda_c) + \ldots \quad (6)$$

The ratio of power shown by equation (6) indicates that the differential power output by the WDM coupler 12 is proportional to a shift in either the mean wavelength $\bar{\lambda}$ or the wavelength $\lambda_c$ at which the splitting ratio is 50/50. A non-zero difference between the mean wavelength $\bar{\lambda}$ and the wavelength $\lambda_c$ represents a drift from a 50/50 splitting ratio of the WDM coupler 12.

The temperature sensitivity coefficient of the WDM coupler 12 and the relationship of equation (6) may be used to design the filter characteristic of the loss element 14. The temperature sensitivity coefficient of the WDM coupler 12 relates a change in temperature to a change in the wavelength $\lambda_c$ at which the splitting ratio is 50/50. Moreover, equation (6) relates a change in the wavelength $\lambda_c$ to a proportional shift in differential power output of the WDM coupler 14. Thus, the differential power output of the WDM coupler 12 is directly proportional to the temperature of the WDM coupler 12. The temperature of the WDM coupler 12 determines the wavelength $\lambda_c$ of the WDM coupler 12 at which the splitting ratio is 50/50 and a change in the wavelength $\lambda_c$ results in a shift of the differential power output of the WDM coupler 14.

The filter characteristic of the loss element 14 may account for the directly proportional relationship between temperature and power so that the power output of the WDM coupler 12 is adjusted as a function of temperature.

Figure 5:
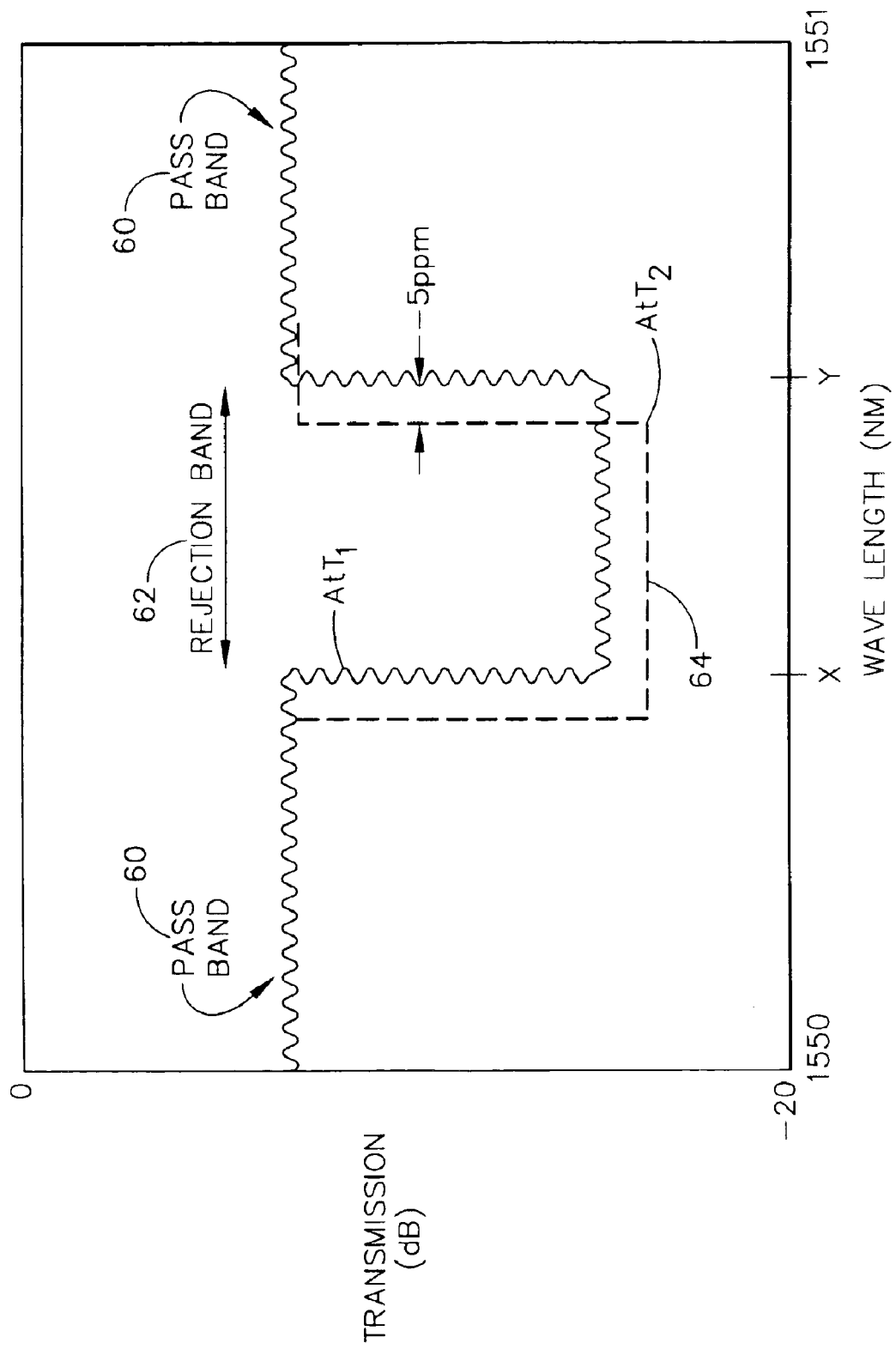
FIG. 5 illustrates an exemplary filter characteristic for the loss element of the WDM coupler.

FIG. 5 illustrates an exemplary filter characteristic of the loss element 14. The filter characteristic may have a rejection band 62 and pass band 60 at temperature $T_1$. The rejection band 62 may reject light having a wavelength, for example, between X to Y. The pass band 60 may pass light having a wavelength, for example, of less than X and greater than Y. The rejection band 62 and the pass band 60 may be designed to shift 64 as the temperature of the loss element 14 changes to temperature $T_2$. The shift 64 preferably matches the temperature sensitivity coefficient of the WDM coupler 14 so that a differential power output is proportionally reduced by the loss element to balance the power at the output ports of the WDM coupler. For example, if the WDM coupler 12 has a temperature sensitivity coefficient of +5 ppm/° C., then the filter characteristic of the loss element 14 may be designed to shift at –5 ppm/° C. The shift at –5 ppm/° C. may proportionally reduce the power output at one of the output ports 20, 22 of the WDM coupler 12 to balance the power.

The filter characteristic of the loss element 14 may be implemented as a fiber grating with an index of refraction that changes as a function of temperature. The fiber grating is a section of the output ports 20, 22 where changes in the refractive index may be written into a core to cause combinations of light transmission and light reflection. Other variations and other arrangements, however, are also possible.

Figure 6:
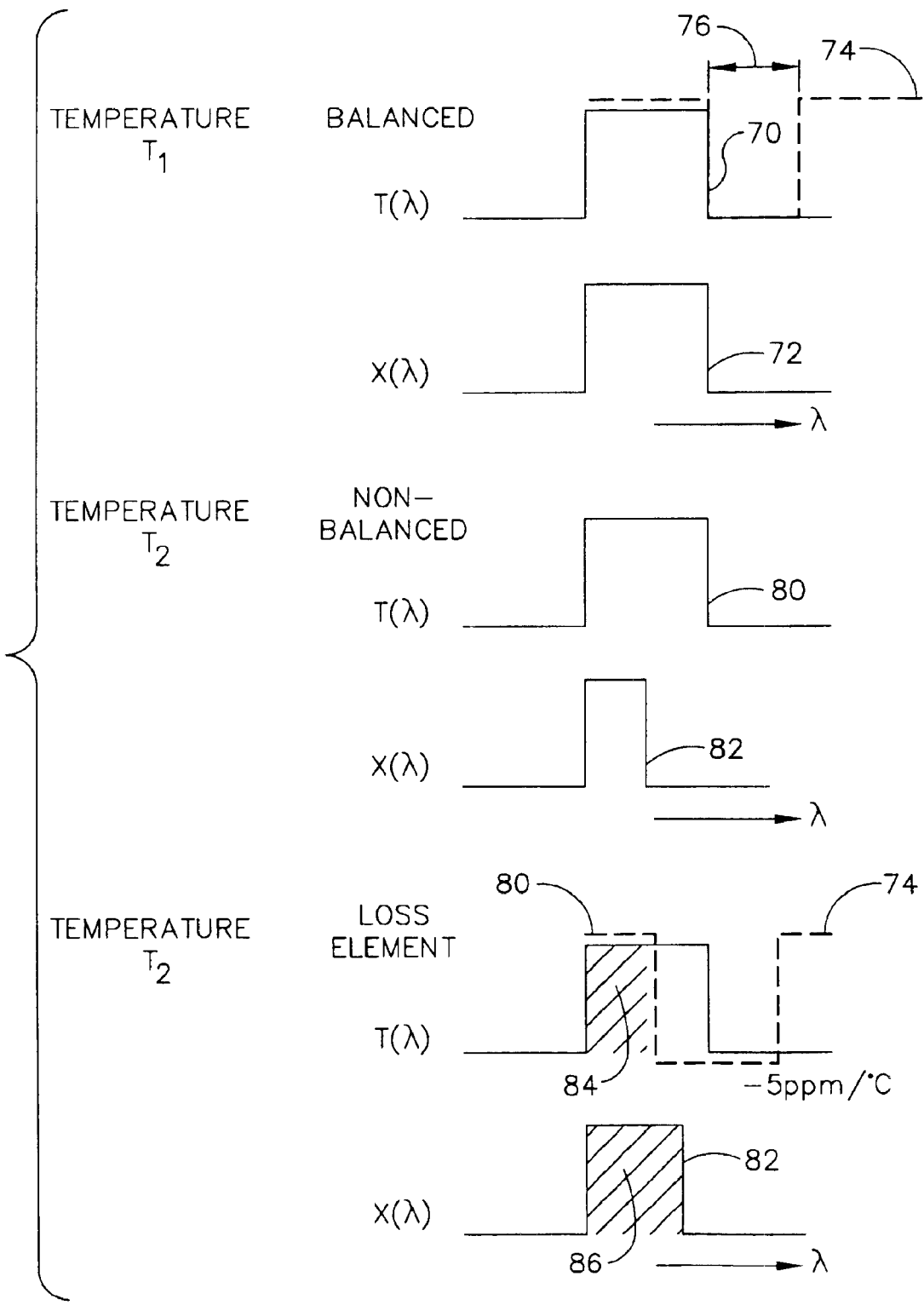
FIG. 6 illustrates use of the loss element to balance power output at two output ports of the exemplary WDM coupler.

FIG. 6 illustrates use of the loss element to balance the power output at the two ports 20, 22 of the WDM coupler 12. Spectrums 70, 72 are representative of the spectrum of light output at the through-port T(λ) and the cross-coupled port X(λ). The power at the two output ports 20, 22 is defined by the area under the spectrum 70, 72. The loss element 14 may be placed at one or more output ports of the WDM coupler 12. The loss element 14 may have a filter characteristic that matches the temperature sensitivity coefficient of the WDM coupler 12.

When the temperature of the WDM coupler 12 results in a splitting ratio of 50/50 at a wavelength of $\lambda_c$, then the output of the WDM coupler 12 is already balanced. The filter characteristic 74 may be designed so that the rejection band 76 does not reject any power output from the output port at temperature $T_1$. The filter characteristic passes the spectrum 70.

If the temperature of the WDM coupler 12 changes, then the power at one output port may proportionally increase and the power of the other output port may proportionally decrease. Spectrums 80, 82 illustrate the light output at the two output ports 20, 22 as a result of the change in temperature from $T_1$ to $T_2$. Again, the area under the spectrums 80, 82 may indicate the power of the light output at the two output ports 20, 22.

According to an exemplary embodiment of the present invention, the loss element 14, placed at the output port having the greater power, may balance the power at the two output ports. The loss element 14 may have a filter characteristic that matches the temperature sensitivity of the WDM coupler 12. For example, if a WDM coupler 12 has a temperature sensitivity of +5 ppm/C, then the loss element 14 may be designed with the filter characteristic 74 that shifts at a rate of –5 ppm/C. The shift 78 may result in a proportional reduction in the power at the output port as illustrated by the area under the spectrum 80 at temperature $T_2$. The reduction in power, illustrated by cross-hatching of 84, 86, may result in the power being balanced at the two output ports 20, 22.

Exemplary embodiments of the present invention have thus been illustrated and described. It will be understood, however, that changes and modifications may be made to the invention as described without deviating from the spirit and scope of the invention, as defined by the following claims.

We claim:

1. A wavelength division multiplexing coupler comprising:
   a coupling section;
   at least one input port;
   a plurality of output ports;
   a loss element;
   wherein the at least one input port is coupled to the coupling section by a wave guide;
   wherein the plurality of output ports is coupled to the coupling section by a plurality of wave guides; and
   wherein the loss element has a filter characteristic that substantially matches a temperature sensitivity coefficient of the wavelength division multiplexing coupler and adjusts power output at one of the output ports to maintain a desired splitting ratio with temperature variation.

2. The wavelength division multiplexing coupler of claim 1, wherein the loss element is a fiber grating.

3. The wavelength division multiplexing coupler of claim 1, wherein the loss element has a filter characteristic comprising a pass band and a rejection band that shifts as a function of temperature.

4. The wavelength division multiplexing coupler of claim 3, wherein the filter characteristic shifts at −5 ppm/C.

5. The wavelength division multiplexing coupler of claim 1, wherein the wavelength division multiplexing coupler has a temperature sensitivity coefficient of +5 ppm/C.

6. The wavelength division multiplexing coupler of claim 1, wherein the wavelength division multiplexing coupler has a temperature sensitivity coefficient of between −20 ppm/C and +20 ppm/C.

7. The wavelength division multiplexing coupler of claim 1, wherein the power output of the at least one of the plurality of output ports is proportional to a shift in wavelength of light input into the at least one input port.

8. The wavelength division multiplexing coupler of claim 1, wherein the light input to the at least one input port is form a light source selected from the group consisting of a fiber optic light source and a semiconductor light source.

9. The wavelength division multiplexing coupler of claim 1, wherein the power output at the at least one output port is balanced.

10. The wavelength division multiplexing coupler of claim 1, wherein the power output of the at least one of the plurality of output ports is proportional to a shift in wavelength of light input into the at least one input port.

11. The wavelength division multiplexing coupler of claim 1, wherein the light input to the at least one input port is form a light source selected from the group consisting of a fiber optic light source and a semiconductor light source.

12. A method comprising:
   determining a temperature sensitivity coefficient of a wavelength division multiplexing coupler;
   passing light from a light source through at least one input port of the wavelength division multiplexing coupler; and
   adjusting, as a function of temperature, power output at a plurality of output ports of the wavelength division multiplexing coupler, the power output being adjusted by a loss element at at least one of the plurality of output ports, the loss element having a filter characteristic that matches the temperature sensitivity of the wavelength division multiplexing coupler.

13. The method of claim 12, wherein the filter characteristic is defined by a rejection band and a pass band that shift as the temperature changes.

14. The method of claim 12, wherein determining the temperature sensitivity coefficient comprises:
   measuring the power output at the plurality of output ports of the wavelength division multiplexing coupler; and
   adjusting a wavelength of the light from the light source so that the power output at the plurality of output ports is balanced.

15. The method of claim 12, wherein the light source is selected from the group consisting of a fiber optic light source and a semiconductor light source.

16. A wavelength division multiplexing coupler comprising:
   two waveguides joined at a coupling section;
   at least one input port on one of the waveguides on a first side of the coupling section;
   each waveguide having an output port on a second side of the coupling section;
   a temperature varying loss element coupled between the coupling section and one of the output ports of one of the waveguides, wherein the loss element has a filter characteristic that substantially matches a temperature sensitivity coefficient of the wavelength division multiplexing coupler such that a desired splitting ratio between the waveguides is maintained with temperature variations for a selected wavelength of light.

17. The wavelength division multiplexing coupler of claim 16, wherein the loss element is a fiber grating.

18. The wavelength division multiplexing coupler of claim 16, wherein the loss element has a filter characteristic comprising a pass band and a rejection band that shifts as a function of temperature.

19. A wavelength division multiplexing coupler comprising:
   two waveguides joined at a coupling section;
   at least one input port on one of the waveguides on a first side of the coupling section;
   each waveguide having an output port on a second side of the coupling section;
   means for maintaining a desired splitting ratio between the waveguides with temperature variations for a selected wavelength of light, said means including a loss element having a filter characteristic that matches the temperature sensitivity of the wavelength division multiplexing coupler.

* * * * *